Jan. 9, 1962 E. O. NORRIS 3,016,274
MAGNETICALLY SPACED BALL BEARING
Filed March 19, 1959 2 Sheets-Sheet 1

INVENTOR
EDWARD O. NORRIS
BY
ATTORNEY

Jan. 9, 1962   E. O. NORRIS   3,016,274
MAGNETICALLY SPACED BALL BEARING
Filed March 19, 1959   2 Sheets-Sheet 2

INVENTOR
EDWARD O. NORRIS.
BY
ATTORNEY

United States Patent Office 3,016,274
Patented Jan. 9, 1962

3,016,274
MAGNETICALLY SPACED BALL BEARING
Edward O. Norris, Ledgemoor Lane, Westport, Conn.
Filed Mar. 19, 1959, Ser. No. 800,525
6 Claims. (Cl. 308—199)

This invention relates to ball bearings and more particularly to a ball bearing having magnetic spacing means for the balls to replace the usual mechanical spacer.

The primary object of this invention is to provide a type of ball bearing which, under normal operating conditions, has a predictably longer life, higher reliability factor, and greater load capacity than comparable standard ball bearings.

A further object is to provide such a bearing which under abnormal operating conditions, such as continuous high speed operation without any form of lubrication, or such operation at abnormally high or low temperatures, or such operation in a vacuum, or in a contaminated condition, or under abnormal race misalignment or load unbalancing, has a superior reliability and performance characteristics.

A further object is to provide a bearing of the above type which has low running and starting torque drag.

A still further object of the invention is to provide a bearing of the above type which may be easily and completely disassembled for cleaning and inspection and as readily reassembled.

A further object is to provide an improved bearing in which the balls are maintained in uniformly spaced relationship without the use of structural or physical separators.

Another object is to provide a ball bearing where the balls are maintained in uniformly spaced relationship, by means of a uniform magnetic field.

A further object is to provide a bearing of the above type where the nature of the field path is such that the balls cannot become permanently magnetized.

Other objects will become apparent from the following description.

In accordance with the present invention, the balls are subjected to a uniform magnetic field in which the magnetic flux enters the balls in a direction parallel to their axes of rotation and returns through the point of rolling contact of the balls with their races and through the magnetic return member to complete the magnetic path. The arrangement is such that the points of rolling contact of the balls with the races all have the same magnetic polarity so that the magnetic repulsion between the adjacent surfaces of successive balls assist the uniform magnetic field in maintaining the required spacing.

The invention will be better understood by referring to the following description, taken in connection with the accompanying drawings in which a specific embodiment thereof has been set forth for purposes of illustration.

Figure 1:
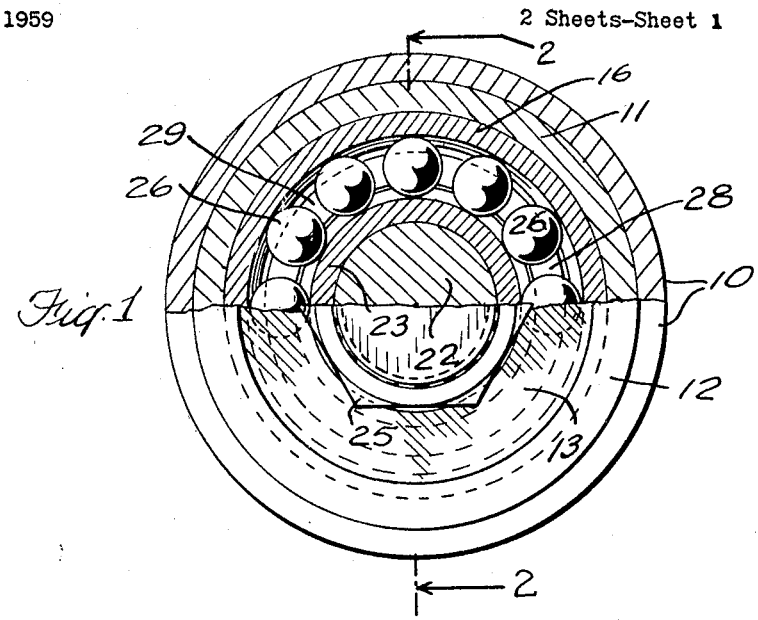
FIG. 1 is an end elevation of a bearing embodying the invention with parts in section taken along the line 1—1 of FIG. 2.
Figures 2, 3:
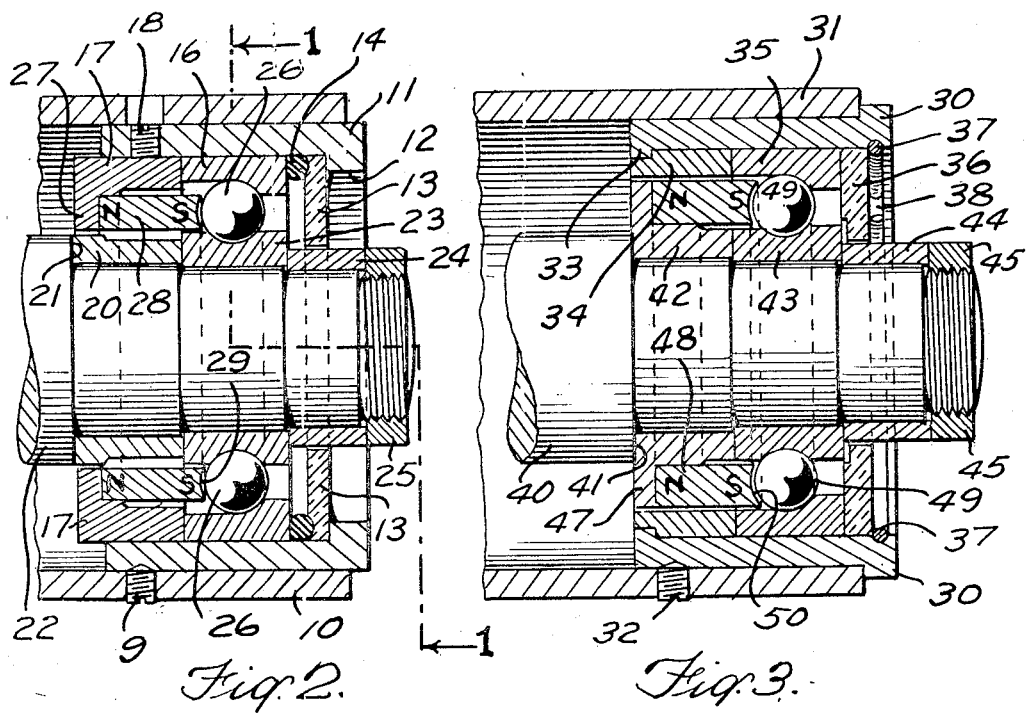
FIG. 2 is an axial section taken on the line 2—2 of FIG. 1 showing a stationary ring magnet disposed axially on one side of the ball path.
FIG. 3 is a section similar to FIG. 2 showing the ring magnet mounted to rotate with the shaft.

Referring to the drawings more in detail, the invention is shown in FIGS. 1 and 2 as applied to a bearing comprising a housing 10 having a sleeve 11 secure therein by a set screw. The sleeve 11 is provided with a shoulder 12 against which a closure ring 13, which may be composed of a transparent plastic to expose the bearing to view, is held, as by a soft ring 14 of neoprene or rubber, or other insulating and compressible material.

An outer bearing race 16 is disposed against the ring 14 and a ring 17 of magnetic permeable material, such as soft steel, is secured in the sleeve 11 by a set screw 18 in a manner to hold the ring 14 under compression.

An inner magnetic field ring 20 is disposed against a shoulder 21 on a shaft 22 in contact with inner ball race 23. The race 23 is secured by a spacing ring 24 and a threaded nut 25.

Bearing balls 26 roll between the inner race 23 and the outer race 16. The races 16 and 23 are grooved in the usual way to cause the outer race 16 to follow axial expansion of the shaft 22, the compressible spacing ring 14 being adapted to permit such limited movement of the race 16.

The outer field ring 17 is formed with a radial flange 27 against which is seated a ring magnet 28 composed of a molded mixture of ceramic and magnetic material, such as Indox 1 produced by The Indiana Steel Products Co. of Valparaiso, Indiana. The magnet 28 is permanently polarized in an axial direction and as an example may have its N pole on the left in FIG. 2 and its S pole toward the balls 26 on the right. The ring magnet 28 is disposed in axial alignment with the centers of the balls 26 and has its face 29 concave to reduce the air gap between the ring 28 and the balls. Ring magnet 28 may be attached to field ring 17 by a suitable adhesive such as one of the epoxies.

The ring magnet above described is characterized by an extremely uniform flux distribution around its entire periphery, which is utilized in maintaining a uniform spacing of the balls 26 around the bearing.

In the bearing the spacing of the balls is maintained entirely by magnetic force. The force has been found to maintain the spacing under varying conditions of load even in bearings operating at high speeds, that is speeds of the order of several thousand r.p.m. The bearing operates without lubrication as there are no sliding surfaces as would be the case where a spacing ring is used as a mechanical spacer for the balls.

It will be noted that the magnet path extends from the S pole surface 29 of the ring magnet 28 into the balls 26 in a direction parallel to their axes of rotation. Then the path splits, one path extending radially outward through the point of rolling contact of the balls with the outer race 16, then axially along the outer race 16 to the field ring 17 and through the radial lip 27 to the N pole of the ring magnet 28. The other path extends radially inward through the balls 26 to the point of rolling contact with the inner race 23, thence axially along the inner race 23 to the field ring 20 and through the air gap to the lip 27 to the N pole of the ring magnet 28.

The spacing effect is believed to be due to two factors. First, the balls tend to assume a position such that the lines of magnetic force are balanced and this occurs when the balls are uniformly spaced.

Secondly, the rolling surfaces of the balls tend to become S poles (in the above example) due to the passage of the lines of force in the direction indicated. Hence the rolling surfaces of all of the balls assume a like polarity which results in a uniform spacing of the balls by magnetic repulsion.

While the balls may not be permanently magnetized in this direction the effect persists a sufficient length of time during operation to produce a substantial force on the balls.

The embodiment of FIG. 3 is generally similar to that of FIG. 2 except that the ring magnet is disposed to rotate with the inner field ring.

In this form a sleeve 30 is disposed in a housing 31 and held by a set screw 32. The end of the sleeve 30 is formed with an inturned flange 33 against which rests outer field ring 34. The field ring 34 is shouldered to receive and be flush with the flange 33. Outer bearing race 35 rests against the field ring 34, and a closure ring 36 is disposed adjacent the ring 35. The assembly is secured by a snap locking ring 37 seating in a groove 38 in the sleeve 30.

A shaft 40 is formed with a shoulder 41 against which an inner field ring 42 rests. Inner ball race 43 and spacing ring 44 are secured by a nut 45. The inner field ring is formed with an outwardly extending lip 47 against which ring magnet 48 rests. The magnet 48 is disposed in alignment with the centers of the balls 49 and has a concave surface 50 adjacent the balls. The ring magnet 48 is polarized axially as in the case of the magnet 28 of FIG. 2 and the operation is identical with that above described.

Figure 4:
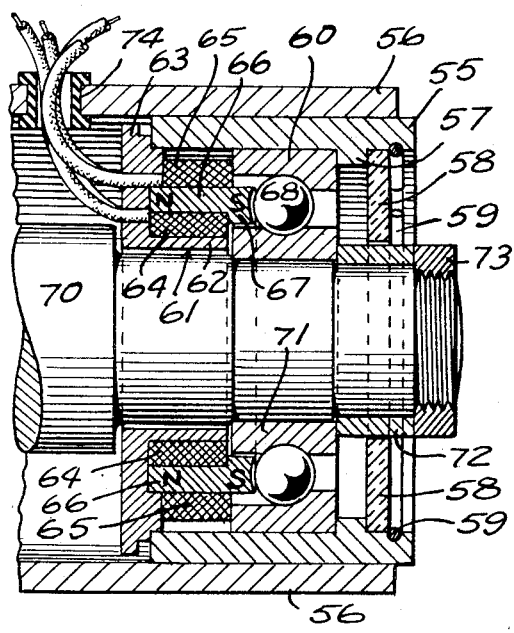
FIG. 4 is an axial section similar to FIG. 2 showing the use of an electromagnet for producing the magnetic field.

Referring to the embodiment of FIG. 4, a sleeve 55 is secured in housing 56. The sleeve is provided with a shoulder 57 against which a closure ring 58 is secured by a snap locking ring 59. Outer ball race 60 engages the shoulder 57 and is secured by a press fit.

Field ring 61 which comprises tubular portion 62 and radial flange 63 is secured in sleeve 55 by a light press fit. Field ring 61 carries an inner coil 64 and an outer coil 65 between which is disposed a ring magnet 66. The ring magnet 66 is provided with an inturned flange 67 on the end toward the balls 68 which is in axial alignment with the centers of the balls 68 and is concaved to provide a minimum clearance therewith. A shaft 70 carries an inner ball race 71 which is disposed in substantially axial alignment with the horizontal flange 62 of the field ring 61 and has a minimum clearance therewith. The inner race 71 is engaged by a spacing tube 72 which passes through the closure ring 58 and is secured by a nut 73. The leads from the coils 64 and 65 extend through the radial flange 63 and pass through hole 74 in the housing 56 to be connected to a suitable source of energizing current.

In this embodiment the ring magnet 66 may or may not be permanently magnetized. If not so magnetized the ring 66 acts as a core for the windings 64 and 65, and functions as an electromagnet. If the magnet 66 is permanently magnetized its flux may be aided or opposed by the windings 64 and 65 so as to obtain the exact field strength required for spacing the balls 68 under the particular operating conditions and for test operation.

The field paths and operation are otherwise similar to that described above in connection with FIG. 2.

Figure 5:
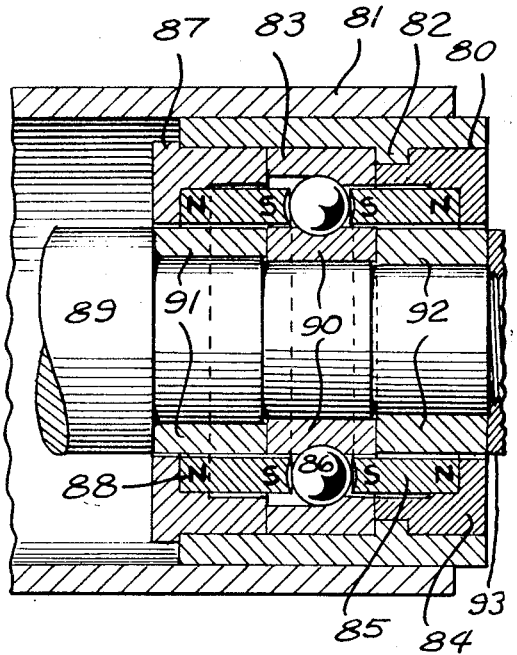
FIG. 5 is a section similar to FIG. 2 showing ring magnets located on both sides of the ball path with magnetic return members associated with each of the magnets.

Referring to FIG. 5 the invention is shown as applied to a bearing construction comprising a sleeve 80 disposed in a housing 81 and having a flange 82 against which outer ball race 83 rests. The outer field ring 84 is disposed on the opposite side of the flange 82 and is recessed so that its face lies flush with the face of the flange. This field ring 84 carries a ring magnet 85 which is axially polarized and is generally in alignment with the centers of balls 86.

A second field ring 87 is disposed on the opposite side of the outer race 83 and carries a ring magnet 88 which is also in axial alignment with the centers of the balls 86.

Said ring magnets are permanently magnetized in an axial direction with their end faces adjacent said balls of like polarity and magnetically permeable rings form return paths for the magnetic field disposed in axial alignment with said inner and outer races and in radial alignment with said ring magnets.

In this embodiment the field paths are the same as in FIG. 2 except that similar field paths are provided on both sides of the balls 86. The ring magnets 85 and 86 are so polarized that like poles are adjacent the balls on each side parallel to their axes of rotation and both fields combine to pass outwardly from the balls 86 to the races 83 and 90 when the fields again separate and return in axially outward directions to the opposite poles of the magnets 85 and 88.

While the above bearing does not require lubrication, it may be desirable in some instances to apply a protective coating to the balls or to the ring magnets so as to eliminate the possibility of corrosion. This protective coating can be retained on the rolling surfaces of the balls due to the absence of mechanical saparators which if present would tend to scrape off or damage such a coating.

A bearing of this type has operated satisfactorily at high speed and under heavy radial load, with only .035 inch spacing between the balls. This permits the maximum number of balls and highest load capacity for a given bearing size.

What is claimed is:

1. In a ball bearing having inner and outer ball races of magnetically permeable material and metal balls of magnetically permeable material disposed to roll between said races, an annular ring magnet mounted in fixed position with respect to one of said races and disposed on one axial side of said balls having an uninterrupted annular face extending around its entire periphery and aligned with the center of said balls as they roll around said races, said ring magnet being magnetized in an axial direction and having a uniform flux distribution around its entire periphery and being positioned to subject said balls to said uniform flux as they traverse the flux in their path of movement, and inner and outer field rings composed of magnetically permeable material disposed adjacent said inner and outer races and in registration with said ring magnet to complete the magnetic return path from said balls through both of said races to said ring magnet whereby the rolling surfaces of said balls are all of the same magnetic polarity.

2. In a ball bearing having inner and outer ball races of magnetically permeable material and metal balls of magnetically permeable material disposed to roll between said races, a pair of annular ring magnets mounted in fixed position with respect to one of said races disposed on opposite sides of said balls and having uninterrupted annular faces in axial alignment with the centers of said balls, said ring magnets being permanently magnetized in an axial direction with said annular faces adjacent said balls of like polarity and having a uniform flux distribution around the entire periphery and being positioned to subject said balls to said flux as they traverse the flux in their path of movement, and magnetically permeable rings forming return paths for the magnetic field disposed in axial alignment with said inner and outer races and in radial alignment with said ring magnets.

3. A ball bearing as set forth in claim 1 in which said ring magnet is carried by the outer field ring.

4. A ball bearing as set forth in claim 1 in which said ring magnet is carried by the inner field ring.

5. A ball bearing as set forth in claim 1 in which said ring magnet comprises an electromagnet.

6. A ball bearing as set forth in claim 1 in which said ring magnet comprises an annular core and field coils are disposed on opposite sides of said core for energizing the same.

References Cited in the file of this patent

UNITED STATES PATENTS

| | | |
|---|---|---|
| 1,730,424 | Harrison | Oct. 8, 1929 |
| 2,381,730 | Ellis | Aug. 7, 1945 |
| 2,913,289 | Stevenson | Nov. 17, 1959 |